(12) United States Patent
Lee et al.

(10) Patent No.: US 11,801,846 B2
(45) Date of Patent: Oct. 31, 2023

(54) VEHICLE AND METHOD OF CONTROLLING THE SAME

(71) Applicants: Hyundai Motor Company, Seoul (KR); Kia Corporation, Seoul (KR)

(72) Inventors: Myoungwon Lee, Yongin-si (KR); Hyeon Seok Hwang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 143 days.

(21) Appl. No.: 17/504,885

(22) Filed: Oct. 19, 2021

(65) Prior Publication Data

US 2022/0126838 A1 Apr. 28, 2022

(30) Foreign Application Priority Data

Oct. 26, 2020 (KR) .......................... 10-2020-0139452

(51) Int. Cl.
| | |
|---|---|
| *B60W 40/08* | (2012.01) |
| *G06F 3/01* | (2006.01) |
| *G06V 20/59* | (2022.01) |
| *B60R 1/12* | (2006.01) |

(52) U.S. Cl.
CPC ............. *B60W 40/08* (2013.01); *G06F 3/013* (2013.01); *G06V 20/597* (2022.01); *B60R 2001/1253* (2013.01); *B60R 2300/70* (2013.01); *B60R 2300/8046* (2013.01); *B60R 2300/8066* (2013.01); *B60W 2540/225* (2020.02)

(58) Field of Classification Search
CPC . B60W 40/08; B60W 2540/225; G06F 3/013; B60R 2001/1253; B60R 2300/70; B60R 2300/8046; B60R 2300/8066; G06V 20/597
See application file for complete search history.

(56) References Cited

U.S. PATENT DOCUMENTS 10,525,890 B2 1/2020 Festerling, Jr. et al.
10,809,801 B1 * 10/2020 Weng .................... G06F 3/1423
(Continued)

FOREIGN PATENT DOCUMENTS

KR 20190102184 A 9/2019

OTHER PUBLICATIONS

International Standard, "Road Vehicles—Ergonomic and Performance Aspects of Camera Monitor Systems Requirements and Test Procedures," ISO 16505, Second Edition, Jul. 2019, 156 pages.

*Primary Examiner* — Mohamed Barakat
(74) *Attorney, Agent, or Firm* — Slater Matsil, LLP

(57) ABSTRACT

A vehicle includes a first sensor for acquiring image data of a rear side, a second sensor for acquiring gaze data of a user, a display for outputting a screen of the image data, an input device for setting a sensitivity to a movement of a user gaze, and a controller for determining reference vector data based on the gaze data at a point in time at which the gaze data starts to be acquired or the gaze data that is preset, for outputting a control signal to output a screen of the image data corresponding to the reference vector data, for acquiring result data including relative position data and relative velocity data of gaze movement data with respect to the reference vector data, and for controlling a signal to output a screen of the image data.

20 Claims, 9 Drawing Sheets

(56) References Cited

U.S. PATENT DOCUMENTS

| | | | |
|---|---|---|---|
| 2008/0055411 A1* | 3/2008 | Lee | B60R 11/0235 348/148 |
| 2016/0196098 A1* | 7/2016 | Roth | G09G 5/00 715/761 |
| 2016/0280136 A1* | 9/2016 | Besson | H04N 5/265 |
| 2019/0126824 A1* | 5/2019 | Oba | E05F 15/70 |
| 2020/0164898 A1* | 5/2020 | Urushizaki | B60R 1/00 |

* cited by examiner

VEHICLE AND METHOD OF CONTROLLING THE SAME

CROSS-REFERENCE TO RELATED APPLICATIONS

This application claims the benefit of Korean Patent Application No. 10-2020-0139452, filed on Oct. 26, 2020 in the Korean Intellectual Property Office, which application is hereby incorporated herein by reference.

TECHNICAL FIELD

The present disclosure relates to a vehicle and a method of controlling the same.

BACKGROUND

Recently, in the automobile industry, research is actively conducted on a technology for tracking a user's gaze using eye tracking technology. Such research is actively conducted not only in the automobile industry, but also in the fields of manufacturing and authentication involving authentication of a person or in the field that requires improvement of a user's convenience in working.

In particular, in order to track a user's gaze, a need to remove noise data arises. Since a user's gaze is related to each person's habit, there is a need to remove undesired data, and a criterion for determining undesired data and logic for removing undesired data are being actively studied.

In addition, in the automobile industry, research is actively conducted on a technology for displaying a rear side image to a user through a display using a Camera Monitor System (CMS) by replacing a side mirror.

SUMMARY

The present disclosure relates to a vehicle and a method of controlling the same. Particular embodiments relate to vehicle for automatically changing a display screen by tracking a user's gaze and a method of controlling the same.

Embodiments of the present disclosure provide a vehicle and a method of controlling the same that may allow a user to view a rear side image without a manipulation by a hand by tracking a user's gaze to automatically change a display screen so that user convenience is improved.

Additional embodiments of the disclosure will be set forth in part in the description which follows and, in part, will be obvious from the description, or may be learned by practice of the disclosure.

According to an embodiment of the disclosure, there is provided a vehicle including a first sensor configured to acquire image data of a rear side, a second sensor configured to acquire gaze data of a user, a display configured to output a screen of the image data, an inputter configured to set a sensitivity to a movement of a user gaze, and a controller configured to determine a reference vector data based on at least one of the gaze data at a point in time at which the gaze data starts to be acquired or the gaze data that is preset, output, through the display, a control signal to initially output a screen of the image data corresponding to the reference vector data, acquire gaze movement data in which a part of the gaze data corresponding to a high frequency higher than or equal to a predetermined frequency from the gaze data is removed based on the sensitivity, acquire result data including relative position data and relative velocity data of the gaze movement data with respect to the reference vector data, and control a signal to output a screen of the image data corresponding to the result data to the display.

The controller may start to acquire the result data if the user gaze is located within a predetermined distance from the display based on the gaze movement data.

The controller may start to acquire the result data if the user gaze is predicted to be located on the display in a predetermined time based on the gaze data.

The controller may remove the high frequency higher than or equal to the predetermined frequency through a low-pass filter to acquire the gaze movement data.

The vehicle may further include a gear shifter, wherein the controller may be configured to, if the user inputs a reverse gear through the gear shifter, output the screen of the image data corresponding to the result data to a lower area of the display.

According to another embodiment of the disclosure, there is provided a method of controlling a vehicle, the method including acquiring image data of a rear side through a first sensor, acquiring gaze data of a user through a second sensor, outputting a screen of the image data through a display, setting a sensitivity to a movement of a user gaze through an inputter, determining reference vector data based on at least one of the gaze data at a point in time at which the gaze data starts to be acquired or the gaze data that is preset, outputting, through the display, a control signal to initially output a screen of the image data corresponding to the reference vector data, and acquiring gaze movement data in which a part of the gaze data corresponding to a high frequency higher than or equal to a predetermined frequency from the gaze data is removed based on the sensitivity, acquiring result data including relative position data and relative velocity data of the gaze movement data with respect to the reference vector data, and controlling a signal to output a screen of the image data corresponding to the result data to the display.

The acquiring of the result data may include starting to acquire the result data if the user gaze is located within a predetermined distance from the display based on the gaze movement data.

The acquiring of the result data may include starting to acquire the result data if the user gaze is predicted to be located on the display in a predetermined time based on the gaze data.

The acquiring of the gaze movement data may include, through a low-pass filter, removing the part of the gaze data corresponding to the high frequency higher than or equal to the predetermined frequency.

The controlling of the signal to output the screen of the image data corresponding to the result data to the display may include, if the vehicle is changed to a rear driving mode through a gear shifter, controlling a signal to output a lower part screen that is lower in an amount of a predetermined reference than a screen corresponding to the result data to a lower area of the display.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
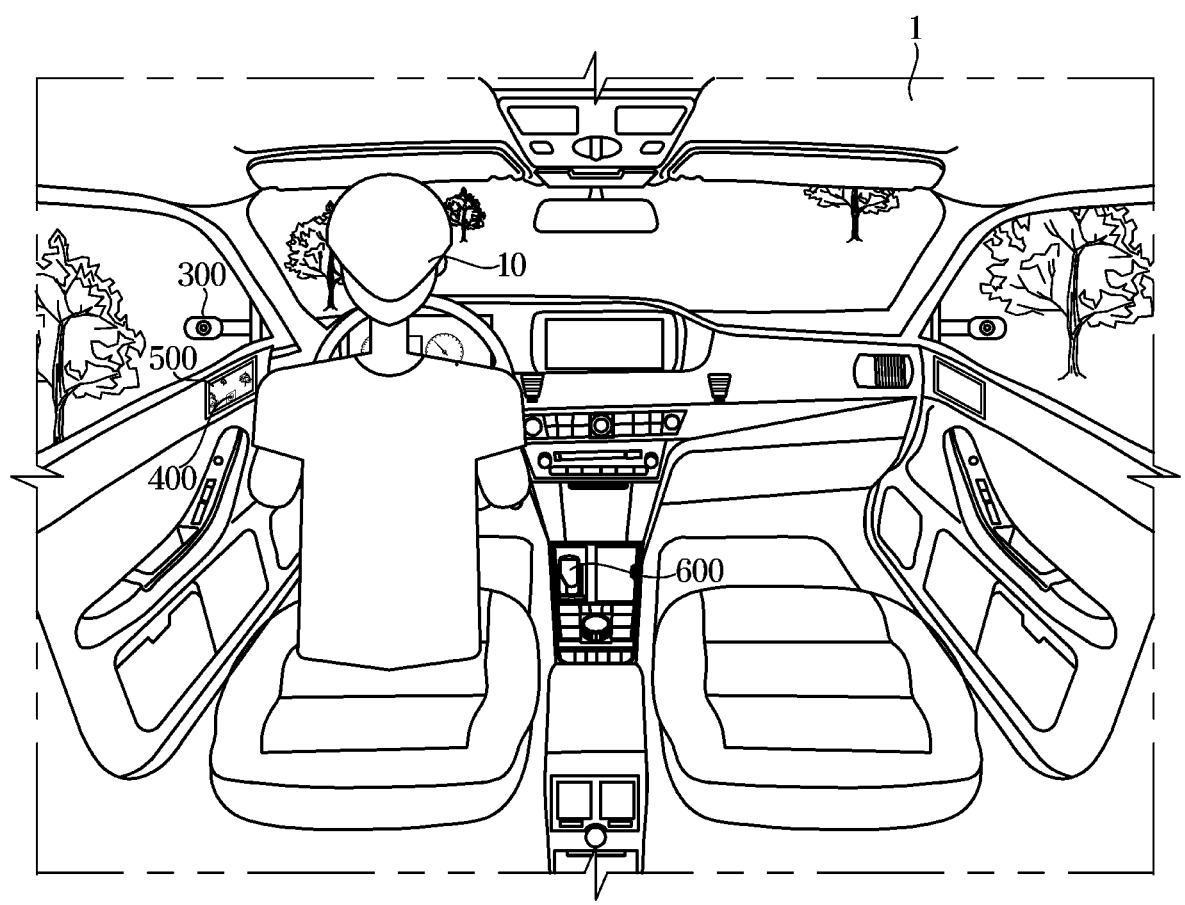
FIG. 1 is a diagram illustrating an operation of displaying a rear image of a vehicle to a user according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

Figure 2:
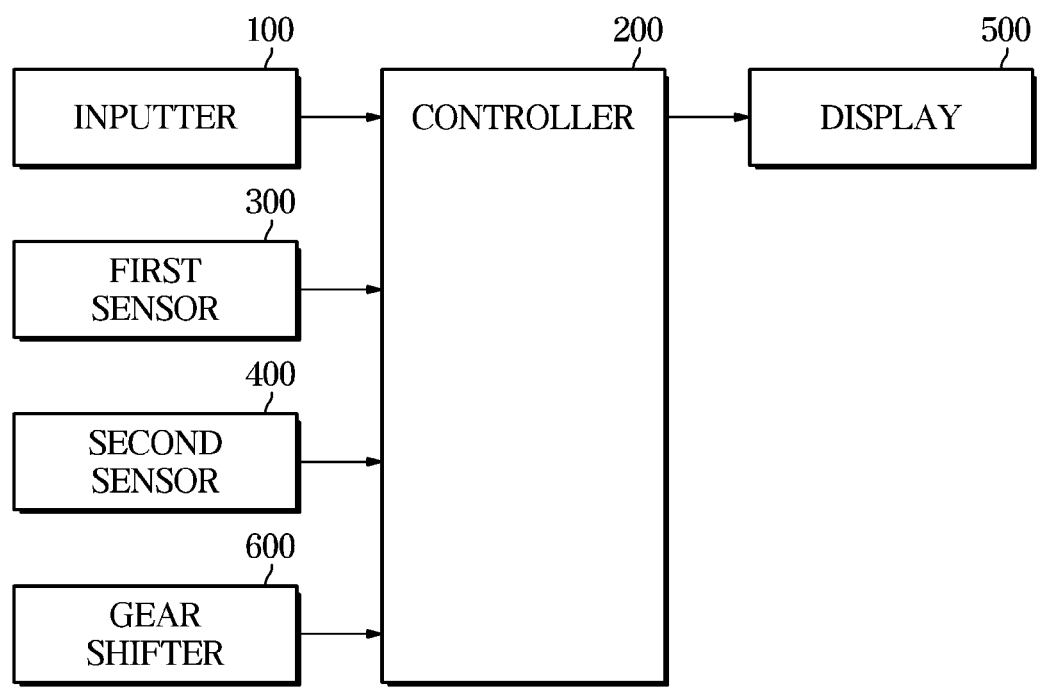
FIG. 2 is a control block diagram according to an embodiment.

FIG. 1 is a diagram illustrating an operation of displaying a rear image of a vehicle to a user according to an embodiment, and FIG. 2 is a control block diagram according to an embodiment.

Referring to FIGS. 1 and 2 in detail, a vehicle 1 includes a first sensor 300 to acquire image data of a rear side, a second sensor 400 to detect a gaze of a user 10, a display 500 to output a screen of image data, an inputter 100 to set a sensitivity to movement of a user's gaze, a controller 200 to determine reference vector data based on at least one of gaze data at a point in time at which the gaze data starts to be acquired or preset gaze data, output a control signal to initially output a screen of the image data corresponding to the reference vector data through the display 500, acquire gaze movement data in which a part of the gaze data corresponding to a high frequency higher than or equal to a predetermined frequency from signals corresponding to the gaze data is removed based on the sensitivity, acquire gaze movement data including relative position data and relative velocity data of the gaze movement data with respect to the reference vector data, and control a signal to output a screen of the image data corresponding to the result data to the display 500, and a gear shifter 600.

The first sensor 300 may refer to a camera that acquires image data of a rear side. The camera of the first sensor 300 may be provided using a camera monitor system (CMS). The first sensor 300 may replace a side mirror or may be mounted next to the side mirror. In acquiring the image data of the rear side, as will be described below, the first sensor 300 may be moved according to the result data based on the result data to acquire images of various angles of the rear side of the vehicle 1. The second sensor 400 may be a camera that acquires gaze data of the user 10. The gaze data may refer to data acquired by tracking a user's gaze through the second sensor 400. In this case, the gaze data may include position and velocity data of the user gaze. The result data may refer to data needed for the user to finally view an image of the rear image. The result data may refer to gaze data of the user 10 that is finally acquired and used by the first sensor 300 to acquire image data of the rear side. As will be described below, the second sensor 400 may acquire data by detecting the gaze of the user 10 and transmit the acquired data to the controller 200. The second sensor 400 may be included in the display 500 and may be mounted on the display 500. The second sensor 400 may be provided using eye tracking technology and may include a plurality of cameras. The second sensor 400 may acquire gaze data of the user 10 by detecting an eye point. The eye point may refer to a middle point between two eyes of the user 10. The display 500 may output a screen of image data. Outputting a screen of image data may refer to displaying an image acquired from the image data through a display. Through the display 500, the user 10 may check an image acquired through the first sensor 300.

The inputter or input device 100 may set the sensitivity to a gaze movement of the user 10. The sensitivity may refer to adding a certain correction to gaze data of the user 10 acquired in real time through the second sensor 400. Adding a correction may refer to removing a high frequency as will be described below. The user 10 may set the sensitivity through the inputter 100, and the sensitivity may be adjusted according to the setting of the user 10. The user 10 may input the sensitivity to remove gaze data corresponding to a high frequency higher than or equal to a predetermined frequency, and the predetermined frequency may be set by the user 10 such that gaze data of the user 10 is acquired and then corrected to acquire gaze movement data based on which desired result data is acquired.

The controller 200 may acquire reference vector data of the gaze of the user 10 through the second sensor 400. The reference vector data of the gaze of the user 10 may be acquired based on a gaze vector set by the user 10 or a gaze vector at a point in time when the result data of the user 10 is acquired, as will be described below. The reference vector data of the gaze of the user 10 may be gaze data that serves as a reference for acquiring gaze data including relative position data and relative velocity data of the gaze of the user 10. The controller 200 may control a signal to output a screen corresponding to the result data on the display 500 based on the result data. The gear shifter 600 may refer to a gear device of the vehicle 1. The gear shifter 600 may refer to a manual or automatic gear device.

The controller 200 is a processor that controls the overall operation of the vehicle 1 and may be a processor of an electronic control unit (ECU) that controls the overall operation of the power system. In addition, the controller 200 may control operations of various modules, devices, etc. built into the vehicle 1. According to an embodiment, the controller 200 may control the operation of each component by generating control signals for controlling various modules, devices, etc. built in the vehicle 1.

In addition, the controller 200 may include a memory in which programs that perform operations described above and below and various data related thereto are stored, and a processor that executes programs stored in the memory. In addition, the controller 200 may be integrated into a System on Chip (SOC) built into the vehicle 1 and may be operated by a processor. However, since a plurality of SOCs may be embedded in the vehicle 1 rather than one SOC, the controller 200 is not limited to being integrated into only one SOC.

The display may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED), but is not limited thereto.

The inputter 100 includes a hardware device, such as various buttons, a switch, a pedal, a keyboard, a mouse, a track-ball, various levers, a handle or a stick for user input.

In addition, the inputter 100 may include a graphical user interface (GUI), such as a touch pad, for a user input, that is, a software device. The touch pad may be implemented as a touch screen panel (TSP) to form a mutual layer structure together with a display.

When the inputter is implemented as a TSP that forms a layer structure with a touch pad, the display may also be used as an inputter.

The controller 200 may be implemented through at least one type of storage medium from among a flash memory type, a hard disk type, a multimedia card micro type, a card type memory (for example, a SD or XD memory), a Random Access Memory (RAM), a Static Random Access Memory (SRAM), a Read-Only Memory (ROM), Electrically Erasable Programmable Read-Only Memory (EEPROM), a Programmable Read-Only Memory (PROM), a magnetic memory, a magnetic disk, and an optical disk. However, it is not limited thereto, and the controller 200 may be implemented in any other form known in the art.

At least one component may be added or omitted to correspond to the performances of the components of the apparatus shown in FIG. 2. In addition, the mutual positions of the components may be changed to correspond to the performance or structure of the system.

Some of the components shown in FIG. 2 may refer to a software component and/or a hardware component, such as a Field Programmable Gate Array (FPGA) and an Application Specific Integrated Circuit (ASIC).

Figure 3A:
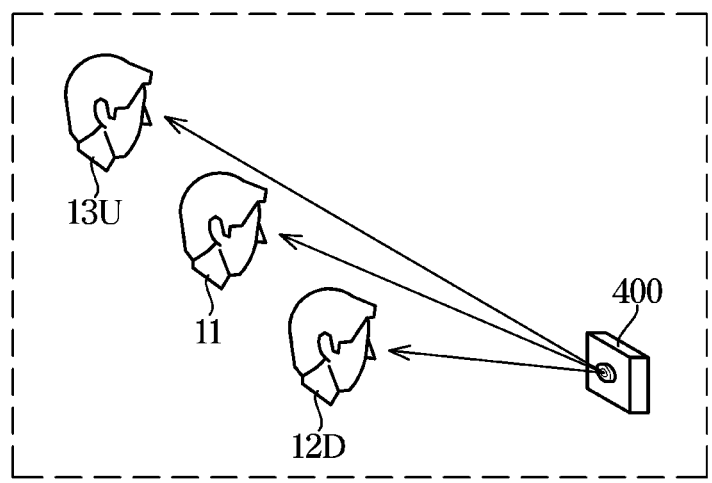
FIGS. 3A and 3B are diagrams illustrating an operation of acquiring user gaze data for each position of a user with respect to a reference vector according to an embodiment.
Figure 3B:
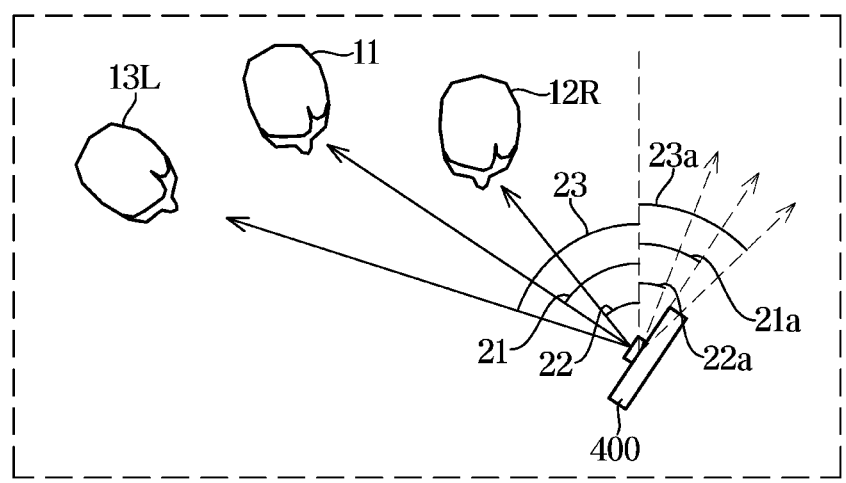
Figure 4:
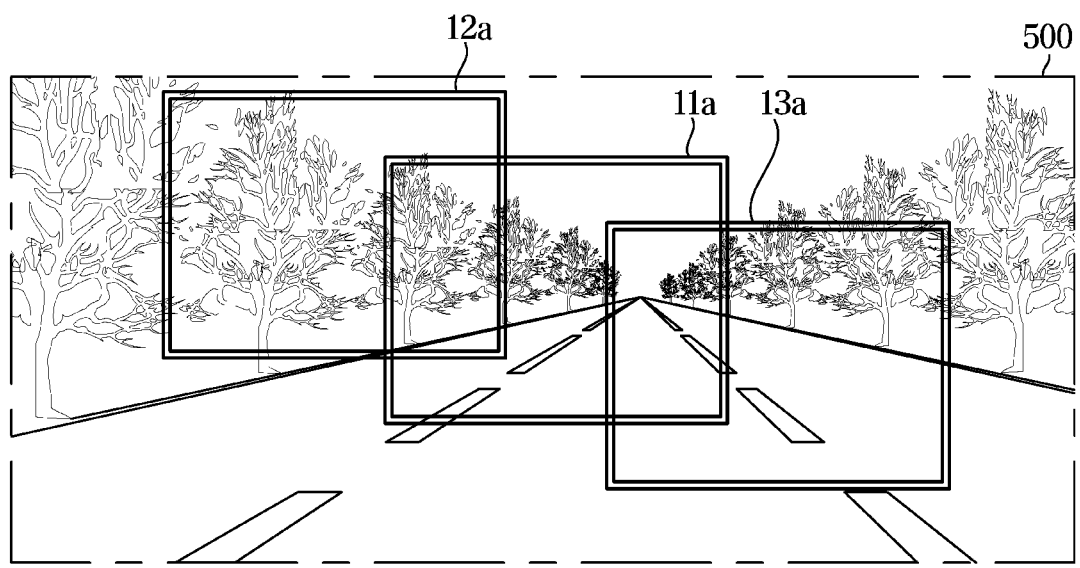
FIG. 4 is a diagram illustrating an operation of outputting a display screen according to a user's position with respect to a reference vector according to an embodiment.
Figure 5:
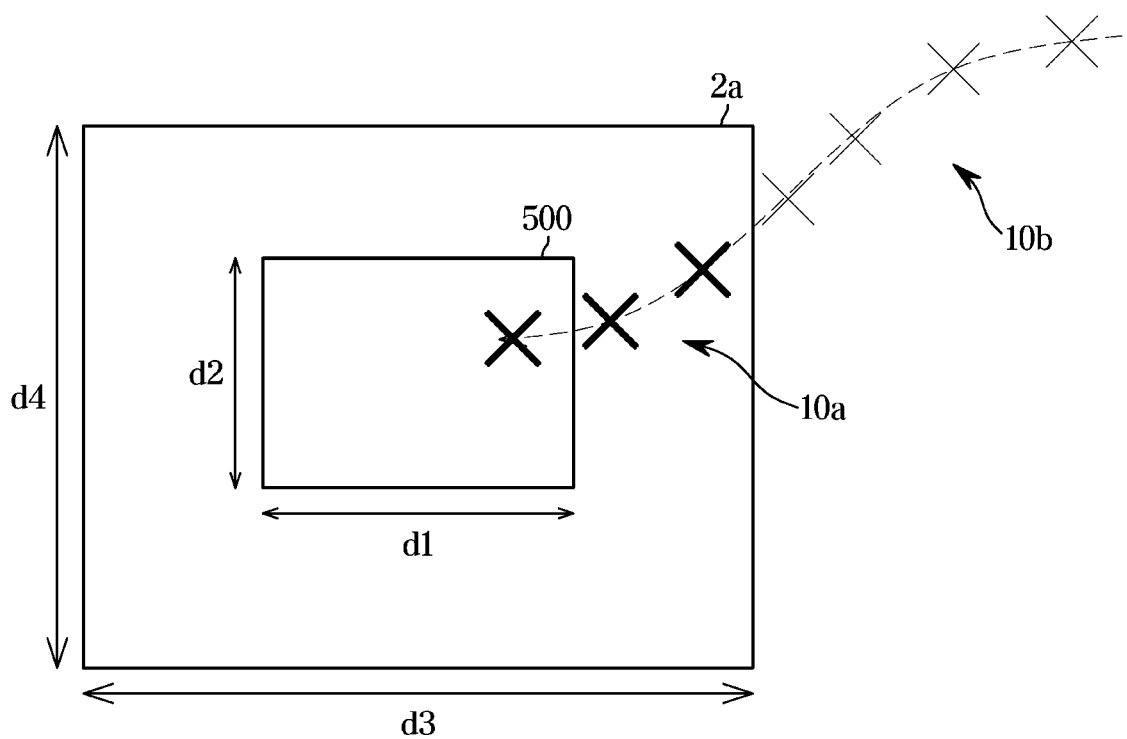
FIG. 5 is a diagram illustrating an operation of determining a time of acquiring a result vector according to an embodiment.

FIGS. 3A and 3B are diagrams illustrating an operation of acquiring user gaze data for each position of a user with respect to a reference vector according to an embodiment, FIG. 4 is a diagram illustrating an operation of outputting a display screen according to a user's position with respect to a reference vector according to an embodiment, and FIG. 5 is a diagram illustrating an operation of determining a time of acquiring a result vector according to an embodiment.

Referring to FIGS. 3, 4, and 5 in detail, result data including relative position data and relative velocity data of gaze movement data may be acquired with respect to reference vector data of a user. To this end, first the reference vector data of the user needs to be acquired. The result data may be started to be acquired based on the user's gaze data when the user's gaze is at a location 10a within an area of predetermined distances d3 and d4 from the display 500. In addition, gaze movement data is analyzed through a specific algorithm and when it is predicted that the gaze of the user is to be located in an area of d1 and d2 corresponding to the display 500 in a predetermined time, the result data may be started to be acquired. In this case, the reference vector data may be gaze data at a point in time at which the result data is started to be acquired. Alternatively, the reference vector may be set in advance by user setting. For example, a comfortable sitting posture of a user may be set in advance and gaze data obtained when a user looks at the display 500 in the comfortable sitting posture may serve as reference vector data.

A method of setting the reference vector data may be performed by a user through the inputter, or by other general methods. When the reference vector data is determined, result data including relative position data and relative velocity data of gaze movement data is acquired with respect to the reference vector data. For example, it may be assumed that the user sits at a position that is left 13L and higher 13U than a position 11 in which the reference vector data is acquirable. Result data corresponding to the higher position 13U and the left side 13L with respect to the reference vector data may be acquired. When a user is located at a position that is left 13L or right 13R of the position 11 in which the reference vector data is acquirable, different result data may be acquired depending on each position. For example, when the user is located at a position in which the reference vector data is acquirable, image data 11a of a center part is acquired through the first sensor 300, but when the user is located on the left side, image data 12a corresponding to the left side of the central part is acquired through the first sensor 300, and when the user is located on the right side 12R, image data 13a corresponding to the right side of the central part is acquired through the first sensor 300. This is because an image acquirable through the first sensor 300 has a limit point. The limit point may refer to a certain size and a certain position in which image data is acquirable. For example, from the position 11 in which the reference vector data is acquirable, the reference vector data may be acquired based on an intermediate angle 21 and a screen image may be acquired up to an area corresponding to an intermediate limit angle 21a.

In a case of a user being located at a right side 12R, result data may be acquired based on a small angle 22 and a screen image may be acquired up to an area corresponding to a small limit angle 22a, and in a case of a user being located at a left right 13L, result data is acquired based on a wide angle 23 and a screen image may be acquired up to an area corresponding to a wide limit angle 23a. The limit angle may refer to an angle to which representation is performable on a screen having a limit point of an image. The acquiring of the result data is not limited to acquiring to the left and right positions from the reference vector data, and may include acquiring result data at a higher position 13U or at a lower position 12D. Even in this case, the image data is also acquired in the same manner as above.

Figure 6:
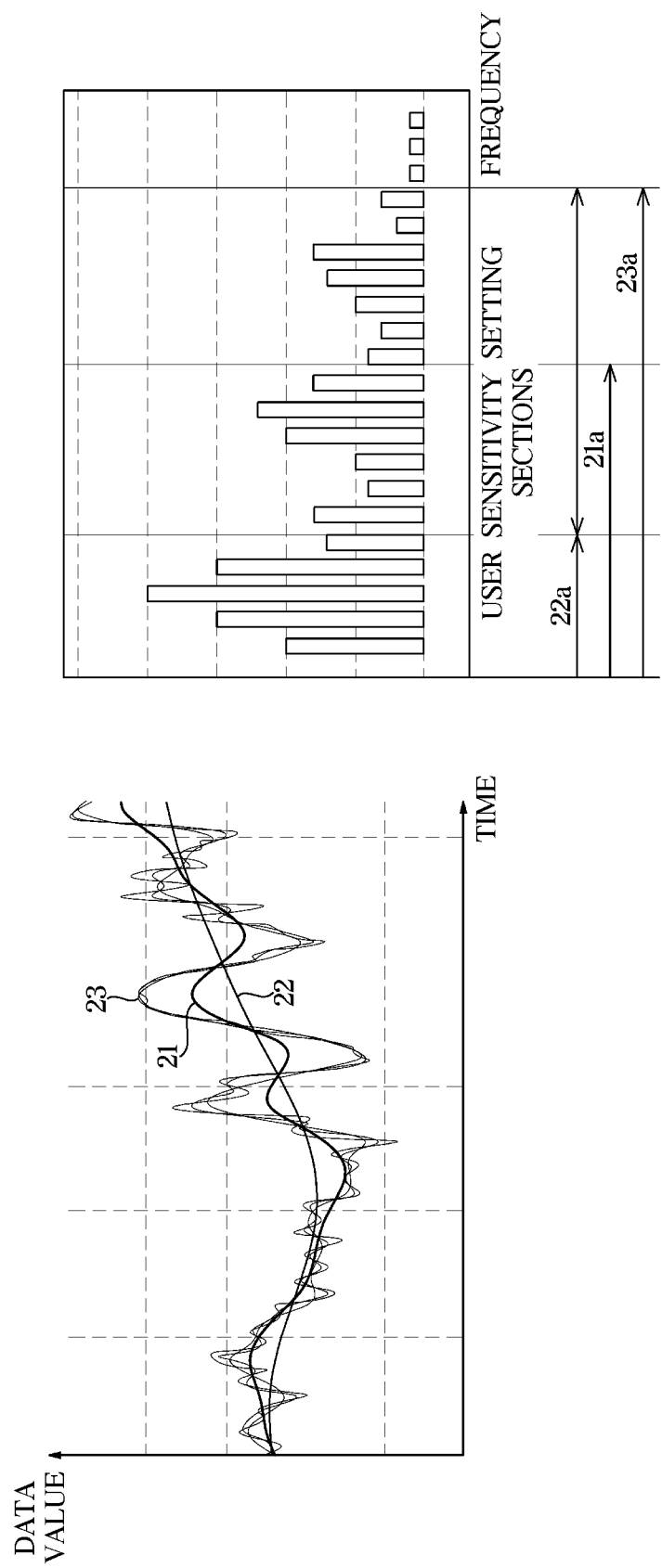
FIG. 6 is a diagram illustrating an operation of acquiring result data by removing gaze data of a user corresponding to a high frequency according to an embodiment.

FIG. 6 is a diagram illustrating an operation of acquiring result data by removing gaze data of a user corresponding to a high frequency according to an embodiment.

Referring to FIG. 6 in detail, gaze movement data of a user may be acquired by detecting a gaze of the user. Thereafter, a position data value of the gaze, a velocity data value of the gaze, and an acceleration data value of the gaze may be acquired from the gaze data. Analog data having the x-axis as the time and the y-axis as the position data value of the gaze, the velocity data value of the gaze, and the acceleration data value of the gaze may be expressed as a graph. Such analog data may be converted into digital data. When converting to digital data, a process of removing high frequencies higher than or equal to a predetermined frequency band may be performed through a low-pass filter. The predetermined frequency band may be set when the user sets the sensitivity through the inputter. With such a process, digital data corresponding to high frequencies is removed, and then the remaining digital data is converted back to analog data to acquire gaze movement data in which a part of the gaze data corresponding to high frequencies is removed. The reason for acquiring the gaze movement data is to prevent undesired gaze movement data from being acquired by erroneously detecting that the user sees the display even when the user moves his eyes a little when the sensitivity is excessively high.

Referring to the analog data first, when the gaze data of the user is determined, data 22 having a low variability, data 21 having a medium variability, and data 23 having a high variability are observed. Here, the data 23 having a high variability may be measurements of a user's gaze that has changed at an excessively high speed in the analysis of user gaze data, and considering such data leads to considering undesired data. To this end, after converting to digital data, gaze data corresponding to high frequencies is removed. Such a process may be considered together with setting the sensitivity. For example, when the sensitivity is set to be very low, a high frequency higher than or equal to a frequency 22a corresponding to the data 22 with a small variability may be set to be removed, and a frequency higher than or equal to a frequency 21a corresponding to the data 21 with medium variability may be set to be removed, and a high frequency higher than or equal to a frequency 23a corresponding to the data 23 with high variability may be set to be removed.

Figure 7:
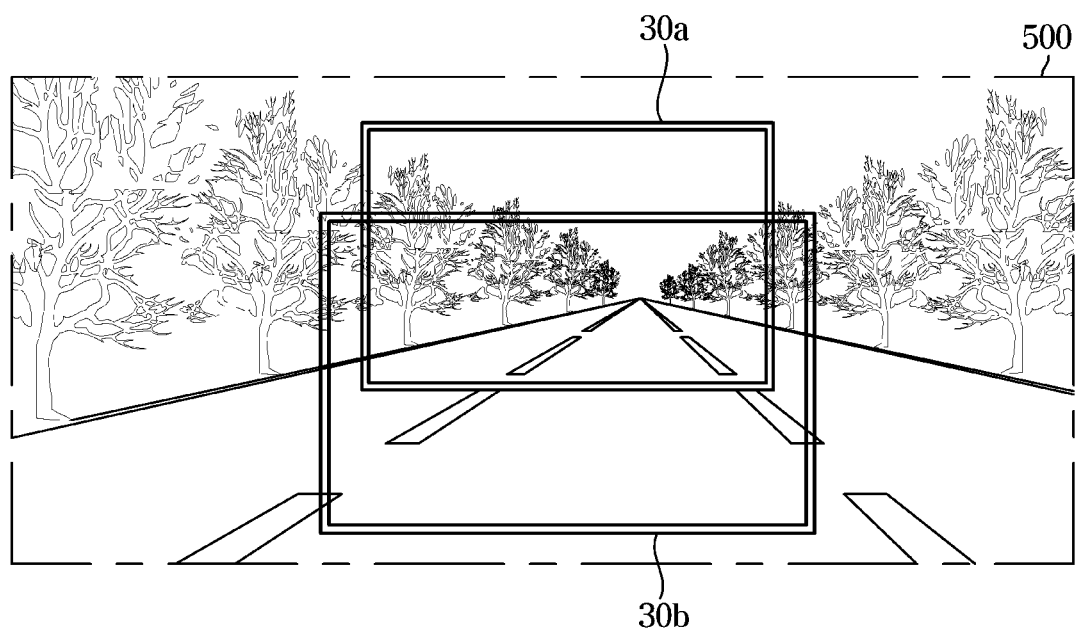
FIG. 7 is a diagram illustrating a display screen output when a user changes a gear shifter of a vehicle to the rear according to an embodiment.

FIG. 7 is a diagram illustrating a display screen output when a user changes a gear shifter of a vehicle to the rear according to an embodiment.

Referring to FIG. 7 in detail, the vehicle may include a gear shifter 600, and the controller may display a screen of image data corresponding to result data when the user inputs a reverse gear through the gear shifter at a lower end of the display. That is, when the vehicle is changed to a rear driving mode through the gear shifter 600, a signal may be controlled to output a lower part screen that is lower in an amount of a predetermined reference than a screen corresponding to the result data. For example, when the user is driving forward, an image 30a displayed on the display 500 may be an image represented as a result acquired through the result data. However, when the user converts the gear shifter to the rear, the screen may display a lower part screen that is lower in an amount of a predetermined reference as an image 30b.

Figure 8:
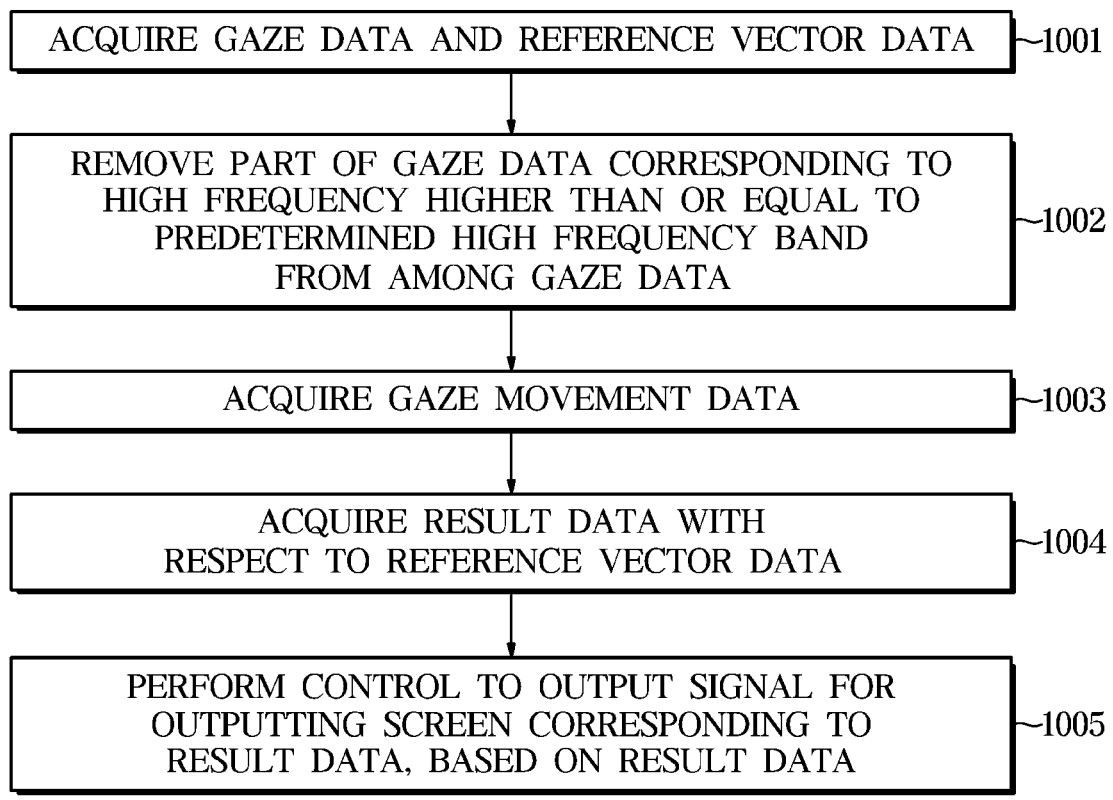
FIG. 8 is a flow chart according to an embodiment.

FIG. 8 is a flow chart according to an embodiment.

Referring to FIG. 8 in detail, gaze data and reference vector data may be acquired (1001). Thereafter, a part of the gaze data corresponding to high frequencies higher than or equal to a predetermined frequency from the gaze data may be removed (1002). Thereby, gaze movement data may be acquired (1003). Thereafter, result data may be acquired based on the reference vector data (1004). Thereafter, based on the result data, a signal for outputting a screen corresponding to the result data may be controlled to be output (1005). In this case, the screen corresponding to the result data may refer to a screen of image data acquired based on the result data. A method of acquiring such data has been described above.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle and the method of controlling the same may allow a user to view a rear image without a manipulation by a hand by tracking a user's gaze to automatically change a display screen so that user convenience is improved.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
a first sensor configured to acquire image data of a rear side;
a second sensor configured to acquire gaze data of a user;
a display configured to output a screen of the image data;
an input device configured to set a sensitivity to a movement of a user gaze; and
a controller configured to:
determine reference vector data based on the gaze data at a point in time at which the gaze data starts to be acquired or the gaze data that is preset;
output through the display a control signal to output a screen of the image data corresponding to the reference vector data;
acquire result data including relative position data and relative velocity data of gaze movement data with respect to the reference vector data; and
control a signal to output a screen of the image data corresponding to the result data to the display.

2. The vehicle of claim 1, wherein the controller is further configured to acquire the gaze movement data in which a part of the gaze data corresponding to a frequency higher than or equal to a predetermined frequency from the gaze data is removed based on the sensitivity.

3. The vehicle of claim 1, wherein the controller is configured to start to acquire the result data when a focus of the user gaze is located within a predetermined distance from the display based on the gaze movement data.

4. The vehicle of claim 1, wherein the controller is configured to start to acquire the result data if a focus of the user gaze is predicted to be located on the display in a predetermined time based on the gaze data.

5. The vehicle of claim 1, wherein the controller is configured to apply a low-pass filter to the gaze data to remove a part of the gaze data corresponding to a frequency higher than or equal to a predetermined frequency to acquire the gaze movement data.

6. The vehicle of claim 1, further comprising a gear shifter, wherein the controller is configured to output the screen of the image data corresponding to the result data to a lower area of the display in response to the gear shifter being shifted to a reverse gear.

7. A method of controlling a vehicle, the method comprising:
   acquiring image data of a rear side;
   acquiring gaze data of a user;
   outputting a screen of the image data;
   setting a sensitivity to a movement of a user gaze;
   determining reference vector data based on the gaze data at a point in time at which the gaze data starts to be acquired or the gaze data that is preset;
   acquiring result data including relative position data and relative velocity data of gaze movement data with respect to the reference vector data; and
   controlling a signal to output a screen of the image data corresponding to the result data.

8. The method of claim 7, further comprising acquiring the gaze movement data in which a part of the gaze data corresponding to a frequency higher than or equal to a predetermined frequency from the gaze data is removed based on the sensitivity.

9. The method of claim 7, wherein acquiring the result data comprises starting to acquire the result data if a focus of the user gaze is located within a predetermined distance from a display based on the gaze movement data.

10. The method of claim 7, wherein acquiring the result data comprises starting to acquire the result data when a focus of the user gaze is predicted to be located on a display in a predetermined time based on the gaze data.

11. The method of claim 7, wherein acquiring result data comprises acquiring the gaze movement data and applying a low-pass filter to the gaze data to remove a part of the gaze data corresponding to a frequency higher than or equal to a predetermined frequency.

12. The method of claim 7, wherein controlling the signal to output the screen of the image data corresponding to the result data comprises controlling a signal to output the screen of the image data corresponding to the result data to a lower area of a display in response to a gear shifter of the vehicle being shifted into a reverse gear.

13. The method of claim 8, wherein acquiring the result data comprises starting to acquire the result data if a focus of the user gaze is located within a predetermined distance from a display based on the gaze movement data.

14. A system for changing a display of a vehicle, the system comprising:
   a first sensor configured to acquire image data of a rear side;
   a second sensor configured to acquire gaze data of a user;
   the display configured to output a screen of the image data;
   an input device configured to set a sensitivity to a movement of a user gaze; and
   a controller configured to:
      determine reference vector data based on the gaze data at a point in time at which the gaze data starts to be acquired or the gaze data that is preset;
      output a control signal to output a screen of the image data corresponding to the reference vector data;
      acquire result data including relative position data and relative velocity data of gaze movement data with respect to the reference vector data; and
      control a signal to output a screen of the image data corresponding to the result data to the display.

15. The system of claim 14, wherein the controller is further configured to acquire the gaze movement data in which a part of the gaze data corresponding to a frequency higher than or equal to a predetermined frequency from the gaze data is removed based on the sensitivity.

16. The system of claim 15, wherein the controller is configured to apply a low-pass filter to the gaze data to remove the part of the gaze data corresponding to the frequency higher than or equal to the predetermined frequency to acquire the gaze movement data.

17. The system of claim 14, wherein the controller is configured to start to acquire the result data when a focus of the user gaze is located within a predetermined distance from the display based on the gaze movement data.

18. The system of claim 14, wherein the controller is configured to start to acquire the result data if a focus of the user gaze is predicted to be located on the display in a predetermined time based on the gaze data.

19. The system of claim 14, wherein the controller is configured to apply a low-pass filter to the gaze data to remove a part of the gaze data corresponding to a frequency higher than or equal to a predetermined frequency to acquire the gaze movement data.

20. The system of claim 14, further comprising a gear shifter, wherein the controller is configured to output the screen of the image data corresponding to the result data to a lower area of the display in response to the gear shifter being shifted to a reverse gear.

* * * * *